United States Patent
Zimmermann et al.

(10) Patent No.: US 7,333,449 B2
(45) Date of Patent: Feb. 19, 2008

(54) UNEQUAL ERROR PROTECTION IN A PACKET TRANSMISSION SYSTEM

(75) Inventors: Gerd Zimmermann, Eckenthal (DE);
Hui Li, Nürnberg (DE); Fabian Wenger, Göteborg (SE); Jan Lindskog, Pixbo (SE); Mathias Pauli, Nürnberg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 919 days.

(21) Appl. No.: 10/432,519

(22) PCT Filed: Nov. 27, 2001

(86) PCT No.: PCT/EP01/13778

§ 371 (c)(1),
(2), (4) Date: May 23, 2003

(87) PCT Pub. No.: WO02/47315

PCT Pub. Date: Jun. 13, 2002

(65) Prior Publication Data

US 2004/0132442 A1    Jul. 8, 2004

(30) Foreign Application Priority Data

Dec. 4, 2000 (EP) .............................. 00126393.8

(51) Int. Cl.
*H04B 7/212* (2006.01)

(52) U.S. Cl. ..................... 370/321; 370/337; 370/346; 714/704; 455/418

(58) Field of Classification Search ................ 370/321, 370/337, 346; 714/704; 455/418
See application file for complete search history.

(56) References Cited

U.S. PATENT DOCUMENTS

| | | | |
|---|---|---|---|
| 5,287,374 A | 2/1994 | Parr | |
| 5,790,535 A * | 8/1998 | Kou | 370/337 |
| 5,818,826 A | 10/1998 | Kam et al. | |
| 5,878,041 A * | 3/1999 | Yamanaka et al. | 370/395.65 |
| 6,430,159 B1 * | 8/2002 | Wan et al. | 370/246 |
| 6,587,465 B1 * | 7/2003 | Dempo | 370/395.1 |
| 6,771,597 B2 * | 8/2004 | Makansi et al. | 370/230 |
| 6,788,654 B1 * | 9/2004 | Hashimoto et al. | 370/321 |

* cited by examiner

*Primary Examiner*—Danh Le

(57) ABSTRACT

In a packet transmission system, especially wireless transmission system, where data is transmitted in packets at different error protection levels and where the error protection level of one packet (=the succeeding packet) may differ from the error protection level of a preceding packet without providing code termination between the said preceding and the said succeeding packet the performance may degrade in case a different error protection level is used by the preceding packet and the succeeding packet. The invention proposes in these cases to insert a supplementary packet between the preceding and the succeeding packet whereby the error protection level of the supplementary packet is higher than the lowest error protection level that is used either by the preceding or the succeeding packet.

17 Claims, 8 Drawing Sheets

UNEQUAL ERROR PROTECTION IN A PACKET TRANSMISSION SYSTEM

RELATED APPLICATIONS

This application is a 371 of PCT/EP01/13778 filed on Nov. 27, 2001 and is a European Patent Office (EPO) 00126393.8 on Dec. 4, 2000, the contents and disclosures of which are incorporated by reference as is fully set forth herein.

FIELD OF THE INVENTION

The present invention relates to a packet transmission system, especially wireless transmission system, where data is transmitted in packets at different error protection levels and where the error protection level of one packet (=the succeeding packet) may differ from the error protection level of a preceding packet without providing code termination between the said preceding and the said succeeding packet.

BACKGROUND OF THE INVENTION

A packet transmission system according to these features is the European WLAN standard High Performance Radio Local Area Network type 2 (HIPERLAN/2), which was developed by the European Telecommunication Standardization Institute (ETSI) broadband radio access network project (BRAN). ETSI created the BRAN project to develop standards and specification for broadband radio access networks that cover a wide range of applications and are intended for different frequency bands. The scope of the HIPERLAN/2 Technical Specifications are limited to the air interface, the service interfaces of the wireless subsystem, the convergence layer functions and supporting capabilities required to realize the services. Thus the HIPERLAN/2 technical specifications describe only the Physical (PHY) layer and the Data Link Control (DLC) layer, which are core network independent, and the core network specific convergence layer. Network layer and higher layer that are required for a complete system are not subject of the HIPERLAN/2 specification. These specifications are assumed to be available or to be developed by other bodies.

HIPERLAN/2 is designed as a high speed radio communication system with typical data rates from 6 Mbit/s to 54 Mbit/s. It connects portable devices with broadband networks that are based on Internet Protocol (IP), Asynchronous Transfer Mode (ATM) and other technologies. In addition to a centralized mode which is used to operate HIPERLAN/2 as an access network via a fixed access point also a capability for direct link communication is provided. HIPERLAN/2 systems are intended to be operated in the 5 GHz band with a power limit of 1 W mean EIRP (equivalent isotropic radiated power).

HIPERLAN/2 uses the multicarrier scheme Orthogonal Frequency Division Multiplexing (OFDM) which is known to be very robust in frequency selective environments. In the HIPERLAN/2 standard several different coherent modulation schemes like BPSK, QPSK, 16-QAM and optional 64-QAM are specified which are used for subcarrier modulation. For forward error control convolutional codes with rates 1/2, 9/16 and 3/4 are specified which are obtained by puncturing of a convolutional mother code of rate 1/2. The combination of a modulation scheme and a code rate is denoted as physical layer mode. The possible resulting physical layer modes of HIPERLAN/2 are listed in Table 1:

TABLE 1

Physical layer modes of HIPERLAN/2

| Modulation scheme | code rate | bit rate |
|---|---|---|
| BPSK | 1/2 | 6 Mbps |
| BPSK | 3/4 | 9 Mbps |
| QPSK | 1/2 | 12 Mbps |
| QPSK | 3/4 | 18 Mbps |
| 16-QAM | 9/16 | 27 Mbps |
| 16-QAM | 3/4 | 36 Mbps |
| 64-QAM | 3/4 | 54 Mbps |

In order to improve the radio link capability due to different interference situations and distance of mobile terminals (MTs) the appropriate physical layer mode is selected by a link adaptation scheme.

In HIPERLAN/2 data and control information are mapped onto transport channels. A packet is called Protocol Data Unit (PDU). Six different Protocol Data Unit types for different transport channels are specified
  BCH-PDU PDU for Broadcast Channel
  FCH-PDU PDU for Frame Channel
  ACH-PDU PDU for Access Feedback Channel
  SCH-PDU PDU for Short Transport Channel
  LCH-PDU PDU for Long Transport Channel
  RCH-PDU PDU for Random Channel Several PDUS are combined in the Data Link Control (DLC) layer to a PDU train. To establish different data links to different applications, so called Data Link Control Connections (DLC connections), a PDU train may consist of several sequences (in the following also called sub-trains; depicted in FIG. 4). E.g. one DLC connection is established for exchanging e-mail data between an e-mail client application and an e-mail server application and another data layer connection is established for exchanging data between an Internet browser and an Internet server.

The Data Link Control layer of HIPERLAN/2 specifies six different PDU train types:
  Broadcast PDU train
  FCH and ACH PDU train
  Downlink PDU train
  Uplink PDU train with short preamble
  Uplink PDU train with long preamble
  Direct link PDU train The BCH, FCH and ACH contain control information and they are mapped together to one PDU train. In case of multiple antennas the BCH builds the separate Broadcast PDU train and the FCH and ACH for each antenna together the FCH and ACH PDU train. The downlink and the uplink PDU trains contain PDUs of several DLC connections of the same mobile terminal (MT) each containing short transport channel (SCH) as well as long transport channel (LCH). The last four PDU train types (Downlink PDU train, Uplink PDU train with short preamble, Uplink PDU train with long preamble, Direct link PDU train) are processed by an encoder as a whole. Tail bits are appended to each train for code termination purposes. These bits, denoted as tail bits, return the convolutional encoder to a definite initial status, the "zero state". Code termination also is performed for the BCH, FCH and ACH for each PDU separately. This also makes decoding to perform better as a PDU train will end up in a predefined state.

All SCHs of one Data Link Control connection are transmitted with the same physical layer mode. This is also valid for all LCHs of one Data Link Control (DLC) connection. The physical layer mode of SCHs and LCHs of one DLC connection may differ. Also different DLC connections within one PDU train are allowed to use different physical layer modes. As by this in the downlink and in the uplink PDU train a code termination is performed only once per PDU train problems may occur by changing the physical layer mode within a PDU train.

For example assuming the case where the SCHs of one DLC connection are transmitted with the very robust 6 Mbps mode and the following LCHs with the more sensitive physical layer 36 Mbps mode. Therefore the resulting error rates after the decoding of the different PDU types differ significantly. In that case the error rate of the SCHs increases because of the relatively high error rate of the following PDUS. This is because memory is inherent in the decoding process and no code termination is performed between the PDUs with different error protection properties.

There are several reasons why the physical layer mode of the SCHs and LCHs of one DLC connection has been allowed to differ. One reason is that SCHs carry more sensitive information like acknowledgements and therefore the error protection should be as high as possible. Therefore in HIPERLAN/2 only the 6, 9 and 18 Mbps modes have been allowed for the SCHs. The LCHs carry data information. If the physical layer mode is chosen too low there will be no errors but the throughput is restricted by the physical layer mode. If the physical layer mode is chosen to high the error rate is too high and extensive retransmissions will reduce the throughput drastically. The optimum of course depends on an actual transmission situation but to give a coarse orientation a relatively high error rate of 10% may be the optimum for a maximal throughput.

In the following to compare the error protection properties between two packets, packets are denoted to have a higher error protection level, when the packet shows more robustness for transmission errors etc. than the packet it is compared to. Vice versa a packet is denoted to have a lower error protection level if it is more sensitive for transmission errors than another packet it is compared to.

An exemplary result of Bit Error Rate (BER) over time for two packet types with different error protection level is shown in FIG. 5a. A first packet $PDU_N$ is transmitted at a low error protection level, e.g. encoded with a coding rate of 3/4 and modulated by QPSK.

Therefore the resulting Bit Error Rate BER is relatively high. A second packet $PDU_{N+1}$ following this first packet $PDU_N$ is transmitted at a higher error protection level, e.g. modulated as BPSK and encoded by a code rate of 1/2. Due to the high error protection level of the second packet $PDU_{N+1}$ the Bit Error Rate falls to a lower level. In case the first packet $PDU_N$ is provided with a code termination the Bit Error Rate will fall immediately in one step to that lower level at the border between the first packet $PDU_N$ and the second packet $PDU_{N+1}$ (indicated by the dashed line in FIG. 5a).

The solid curve shows the degradation of the error rate at the border from the first packet $PDU_N$ to the second packet $PDU_{N+1}$ if no code termination is applied to the first packet $PDU_N$. In both cases when decoding the second packet $PDU_{N+1}$ the decoder will use samples from the end of the first packet $PDU_N$. In case of code termination these samples will have already converged the decoder into a certain internal state so that the decoding process of the second packet $PDU_{N+1}$ will continue with very reliable samples. In case of a missing code termination the decoder has to use samples from the end of the first packet $PDU_N$ that are less reliable. Thus the high Bit Error Rate of these samples extends behind the end of the first packet $PDU_N$ into the beginning section of the second packet $PDU_{N+1}$. With ongoing decoding less samples of the end of the first packet are used and the impact of the low error protection level of the first packet $PDU_N$ onto the second packet $PDU_{N+1}$ decreases. When no more samples of the first packet $PDU_N$ are used for decoding the Bit Error Rate has reached the typical level of the Bit Error Rate for the physical layer mode of the second packet $PDU_{N+1}$.

The same effect, i.e. a degradation of the error rate occurs if low error protected packets proceed on highly error protected packets. In this case the Bit Error Rate starts to increase already in the midst of the first packet (FIG. 6a).

It is a shortcoming of the state of the art that in a packet transmission system the performance is affected when the error protection level of succeeding packets is changed within a packet transmission sequence without providing code termination. The straight forward idea to introduce an additional code termination by inserting an appropriate number of appropriate tail bits between those packets will mean that the system specification has to be changed accordingly.

SUMMARY OF THE INVENTION

It is an object of the invention to counterfeit the missing code termination by measures that are in (high) accordance with the technical specification, that means that the existing system specification has not to be changed or only moderate changes have to be introduced;

This object is achieved in case a different error protection level is used by the preceding packet and the succeeding packet a supplementary packet is inserted between the preceding and the succeeding packet whereby the error protection level of the supplementary packet is higher than the lowest error protection level that is used either by the preceding or the succeeding packet. That means whenever one or a sequence of packets respectively (=a first sub-train of packets) transmitted at a certain error protection level is seized within a train of packets and one or a sequence of packets with another error protection level respectively (=second sub-train of packets) continues the first sub-train of packets a supplementary packet is inserted between the first sub train of packets and the second sub-train of packets.

Error protection level hereby means measures that promise certain robustness against transmission errors (e.g. a certain modulation scheme) or/and permit error free signal restitution by evaluating redundancy (e.g. by an appropriate coding scheme). In this context higher and lower error protection level is understood as a relative defined term: Higher error protection level of a packet means that this packet is protected better against transmission errors than a packet with lower protection level. E.g. using a low level modulation scheme such as BPSK makes that packet more robust for transmission errors. Therefore a packet with BPSK has a higher error protection level (=better error protection property) than a packet modulated in QPSK (provided that the same encoding scheme is used for both packets). Provided the same modulation scheme is used packets to which more redundancy has been introduced while being encoded, which may be expressed by the code rate, will have the higher error protection level in comparison to the other packet. As it is well known low level modulation schemes and high redundancy degrade the bit rate. Therefore in general the error protection level of the transmitted packets are chosen not to high in order to achieve a high bit rate but also not to low to ensure an error free restitution of the transmitted information. Of course the code rate is just an example for expressing the error protection property.

An appropriate mix of modulation scheme and code rate will allow graduated levels of error protection. In HIPERLAN/2 for instance these levels of error robustness are called physical layer modes. E.g. in table 1 the layer mode depicted in the top line of the table (BPSK with a code rate of 1/2 has the highest error protection property of all the physical layer modes of that table. Advancing from line to line to the bottom of the table the error protection property in principle decreases. But as it can be seen from the third column the bit rate is increased vice versa.

Thus it mainly depends on the system specification what is defined as error protection level. For example in a system where always the same modulation scheme is used only e.g. the code rates of the preceding packet and the succeeding packed have to be evaluated to decide at which error protection level, e.g. at with which code rate the supplementary packet has to be encoded. But also in systems with a mix of different error protection measures it might keep a system simpler to evaluate and apply only one of these measures for the supplementary packet.

At first let us consider a case where a first sequence of packets is followed by a second sequence of packets where the packets of the second sequence are provided with a higher error protection level than the packets of the first sequence. In this case the error protection level of the supplementary packet which is inserted between said first sequence and said second sequence must provide an error protection level that is at least higher than the error protection level of the packets of said first sequence. By this the last packet of said first sequence of packets would be decoded as usual without any negative effect. The decoding of the supplementary packet will degrade in the beginning, as the error protection property of the preceding packet is lower than the error protection property of the supplementary packet. But by proceeding towards to the end of the supplementary packet the decoder is adapted to that higher error protection level of the supplementary packet. By this the internal states of the decoder will fit exactly or at least better to the packet that succeeds the supplementary packet. In case the inserted packet and the succeeding packets have equivalent error protection levels there is no harm for the succeeding packet at all. As the supplementary packet is inserted for the purpose of being discarded and therefore usually will not contain any useful information, the degradation in the decoding process at the beginning of the supplementary packet does not harm.

In the opposite case the last packet of the first sequence of packets has a higher error protection level than the succeeding packet(s). In this case the error protection level of the inserted supplementary packet will be chosen to be higher than the error protection level of the succeeding packet(s). Preferably it is chosen to be equivalent to the error protection level of the first packet. Without having a supplementary packet inserted, the decoding process will degrade at the end of the preceding packet, as it runs into a packet with lower error protection property. By inserting the supplementary packet a degradation of the said last packet is prevented as the decoding process may proceed at the same error protection level or at least an error protection level that is higher than the error protection level of the succeeding packet. Although the error protection property of the supplementary packet is different to that of the succeeding packet this does not harm the decoding process of the succeeding packet as it is a transition from a higher to a lower error protection level.

It must be ensured that a corresponding receiver treats the supplementary packet accordingly. This can be achieved by marking the supplementary packet in an appropriate way. Appropriate means not that the receiver must recognize that this is a supplementary packets which has been inserted for the purpose to adapt the decoder to a different error correction level. It is sufficient to use a packet type by which the receiver will not be caused to do any actions also if the packet is corrupted by the change of the error protection level. By this any additional overhead on the air interface and delay times, for example that the receiver requests a retransmission of that corrupted packet should be prevented. Therefore in an unacknowledged transmission mode it is sufficient to use a wrong cross reference code to mark the supplementary packet. If the receiver receives a packet with a cross reference code that pretends that the packet could not be fully corrected the receiver will not pass this packet further on. In acknowledged transmission modes the marking of the supplementary packets has to be a little bit more sophisticated.

In a first embodiment a dummy packet is used to separate the packets with different error protection levels. A dummy packet usually will be a packet carrying no information and therefore the dummy packet will just have to be discarded by a receiver.

The system has to be changed thus that it is able to handle dummy packets in the receiver. E.g. in HIPERLAN/2 this packet type is already defined. The original reason for the specification of the LCH dummy PDU was to provide the mobile terminals with the possibility to send something in the case when they have requested more transmit time than they can fill with information. The SCH dummy PDU was introduced for the case when an unacknowledged receiver was given SCH transmit opportunities. As the SCH PDU is shorter than the LCH PDU it is preferable to use the SCH for separating different error protected PDUs.

Therefore this embodiment does not need to be specified in the standard explicitly if a dummy packet with high error protection level is already specified for other purposes, like in HIPERLAN/2. In this case only the transmitter has to be changed to insert a dummy packet between packets of different error protection levels. If dummy packets are already defined (for other purposes) no changes in the receiver and therefore no changes in an agreed upon standard are required, as the receiver is already designed to handle these dummy packets. This also ensures interoperability between transceivers that are not equipped according to the invention and transmitters according to the invention.

In an another embodiment the inserted packet is a copy of the preceding packet (in case the error protection level of the packets will be lowered) or a copy of the succeeding packet (in case the error protection level will be raised). That means that the packet with the higher error protection level is transmitted twice. The principle is the same as in the first solution. The difference is that instead of a dummy packet carrying no information either the proceeding packet or the succeeding packet is repeated. The advantage of this embodiment is that no specification of a special dummy packet type in the standard is necessary. The only precondition for this solution is that the receivers have to be able to cope with transmissions of two packets with the same content. As in HIPERLAN/2 all packets are provided with a sequence number for identifying missing or corrupted packets as well as repeated packets the capability to discard repeated packets is inherent to a receiver conforming to HIPERLAN/2.

It may be also considered to create a new type of packet only for the purpose of inserting that supplementary packet. The advantage of a special packet is that it could be designed that it is just long enough to bring the decoder into the right initial state. Thus the overhead caused by a supplementary packet is minimized. On the other hand such an optimized supplementary packet has to be especially handled by the receiver.

Another solution, that will not require a big amendment of the specification is to use the bits which are reserved for future use (FU) for code termination still providing the possibility to use most of these bits later for other purposes. By this the performance of the highly error protected packets remain unchanged until the number of FU bits (FUB) is large enough.

For this solution the changes in the specification are quite heavier than for the other solutions. However the benefit is that the increase of the performance is higher (up to 4 dB compared to the standard solution without any enhancements) because it does not introduce any additional overhead which decreases the gain provided by the code termination.

BRIEF DESCRIPTION OF THE DRAWINGS

In the following the invention will be further described according to the figures and by means of examples
FIG. 1 Transmission system
FIG. 2 Transceiver for a transmission system
FIG. 3 Layer model of a packet transmission system
FIG. 4 PDU train
FIG. 5a Bit Error rate diagrams if error protection level changes from high to low
FIG. 5b Bit Error rate diagrams if error protection level changes from high to low and a dummy-packet is inserted
FIG. 6a Bit Error rate diagrams if error protection level changes from low to high
FIG. 6b Bit Error rate diagrams if error protection level changes from low to high and a dummy-packet is inserted
FIG. 7a Bit Error rate diagrams if error protection level changes from high to low
FIG. 7b Bit Error rate diagrams if error protection level changes from high to low and copy of a packet is inserted
FIG. 8a Bit Error rate diagrams if error protection level changes from low to high
FIG. 8b Bit Error rate diagrams if error protection level changes from low to high and a copy of a packet is inserted
FIG. 9 Modifications in DLC-layer of transmitter
FIG. 10 Modifications in receiver
FIG. 11 packet error rates (PER) over the carrier-to-noise (C/N) ratio

DETAILED DESCRIPTION OF THE INVENTION

Figure 1:
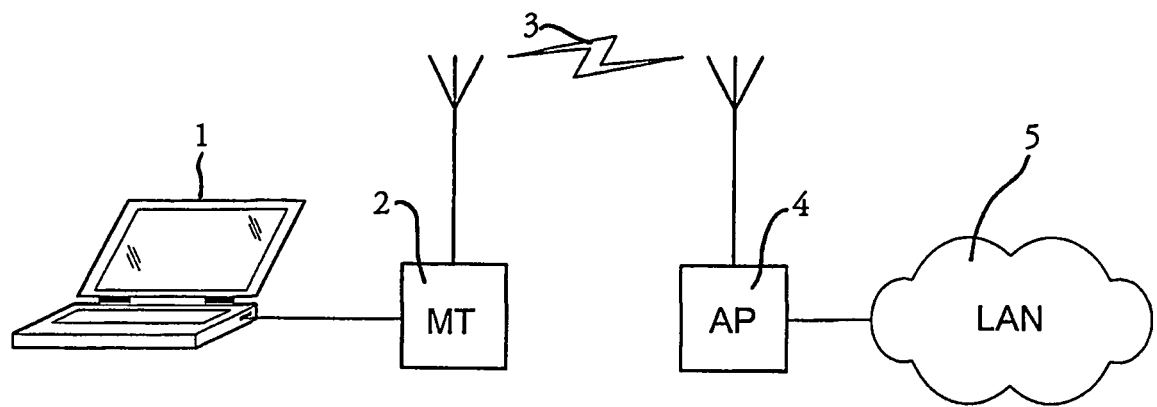

FIG. 1 shows a packet transmission system according to the invention. A typical application of such a system is to connect a portable computer, e.g. a laptop 1 to a core network 5, e.g. a company's private local area network (LAN) or the Internet. Depending on the packet format used in the LAN 5 the packets are for example formatted in TCP/IP format. For the purpose of exchanging data packets between the personal computer 1 and the core network 5 the portable computer 1 is connected to a mobile terminal 2 via an appropriate internal or external interface. Mobile terminals 2 may be constructed that they fit into a so-called PCMCIA-slot of the personal computer 1. For communication with mobile terminals 2 one or more so-called access points 4 are connected to the core network 5. The general difference between a mobile terminal 2 and an access point 4 is that the access point 4 is designed to control several radio links 3 to several mobile terminals 2 at one time.

Figure 2:
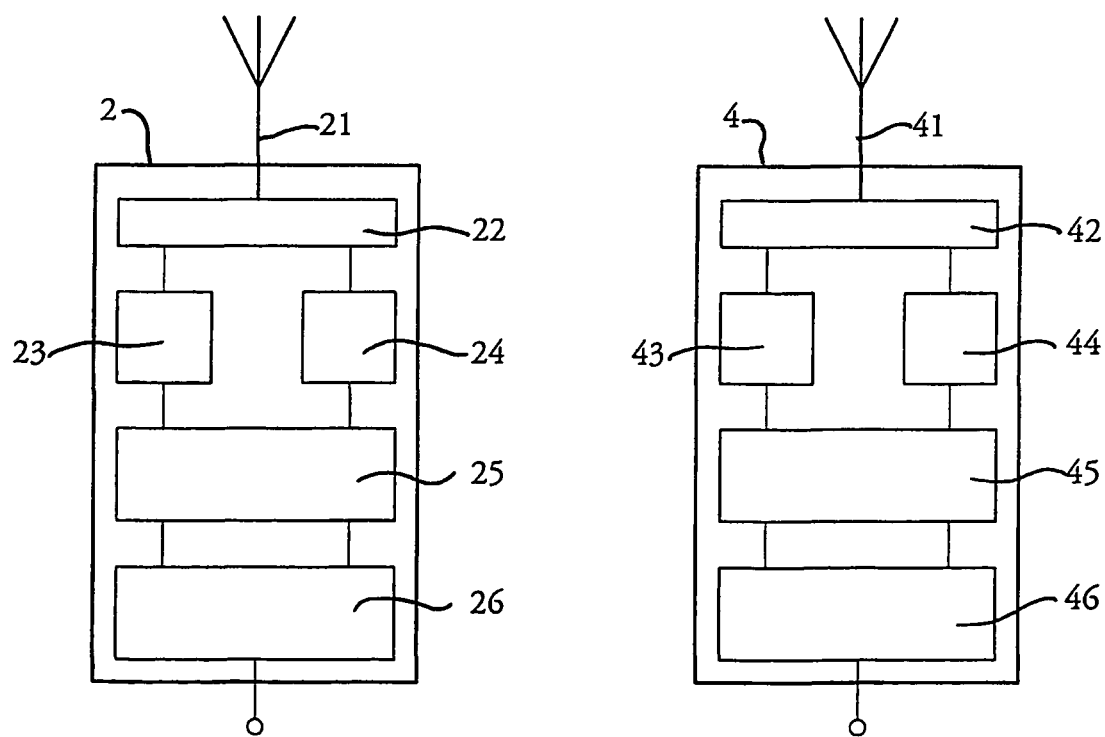

FIG. 2 shows the basic hardware components of a mobile terminal 2 and an access point 4. In this condensed overview no difference between the hardware of a mobile terminal 2 and the access point 4 can be seen. For duplex exchange of the packets mobile terminal and access point are equipped each with an antenna 21, 41, an antenna duplex filter 22, 42, a radio frequency receiver part 23, 43, a radio frequency transmitter part 24, 44, a base-band processing part 25, 45 and an interface 26, 46. For interfacing with the personal computer 1 the appropriate interface 25 of the mobile terminal e.g. is an interface for PCMCIA and the interface 46 in the access point 4 e.g. is an Ethernet interface.

Figure 3:
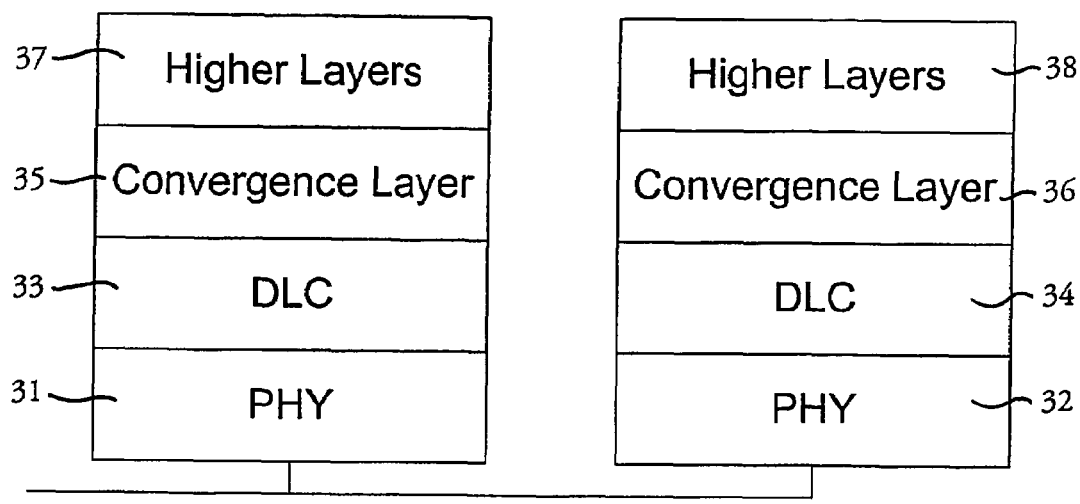
Figure 4:
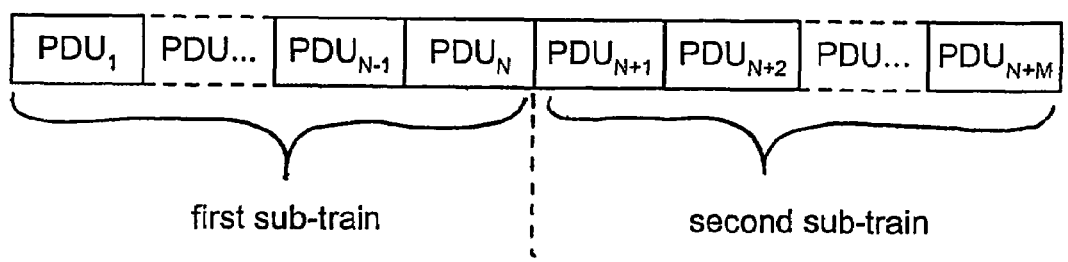

Due to the nature of the invention there are a lot of possibilities well known to the person skilled in the art to implement the invention in hardware. As the invention in a logical form is an extension of a protocol stack the invention is now described by means of a layer model that has been already sketched in the opening paragraphs of this document. The layers of mobile terminal and an access point are depicted in FIG. 3. The layers 31, 33, 35, 37 of the Mobile Terminal are depicted in the left-hand side of FIG. 3 and the layers 32, 34, 36, 38 of the Access Point are depicted in the right hand side of FIG. 3.

The Physical Layer of a HIPERLAN/2 system is described in detail in ETSI document TS 101 475. The Physical Layer 31, 32 offers information transfer services to the Data Link Control Layer 33, 34. For this purpose the Physical Layer provides for functions to map different DLC PDU trains into framing formats called PHY bursts appropriate for transmitting and receiving management and user information between an Access Point and a Mobile terminal. For this the following functional entities are described in different sub-clauses of ETSI document TS 101 475: configuring the transmission bit rate by choosing appropriate PHY mode based on a link adaptation mechanism; scrambling the PDU train content; encoding the scrambled bits according to an forward error correction set during PHY layer configuration; interleaving the encoded bits at the transmitter by using an appropriate interleaving scheme for the selected PHY mode; sub-carrier modulation by mapping the interleaved bits into modulation constellation points and producing the complex base-band signal by OFDM; inserting pilot sub-carriers, appending appropriate preamble to the corresponding PDU train at the transmitter and building the PHY burst and performing radio transmission by modulating the radio frequency carrier with the complex base-band signal at the transmitter. The different physical layer modes have been already depicted in table 1 of this document.

The Data Link Control Layer 33, 34 distinguishes between Basic Data Transport Functions, described in detail in ETSI Document TS 101 761-1 and Radio Link Control sub-layer described in detail in ETSI Document TS 101 762-2. The Basic Transport Function has an Error Control (EC) entity and a Medium Access Control (MAC) entity. The Error Control entity is responsible for detection and recovery from transmission errors on the radio link. Moreover, it ensures in-sequence delivery of data packets. As an Access Point may control several connections to different Mobile Terminals a dedicated Error Control instance will be assigned for each DLC user connection in an Access Point. The Medium Access Control protocol is based on a dynamic TDMA/TDD scheme with a centralized control. The MAC frame appears with a period of 2 ms. Data and control information are mapped onto transport channels (as described in the opening paragraphs of this document) and are delivered and received as PDU trains from the physical layer 31, 32.

The Convergence Layer 35, 36 is also divided in a data transport part and a control part. The data transport part provides the adaptation of the user data format to the message format of the DLC layer 33, 34. The Higher Layers 37, 38 are application layers and therefore not subject of HIPERLAN/2. In case of the embodiment depicted in FIG. 1 the Higher Layer 37 of the Mobile Terminal 2 enables the transfer of data via the PCMCIA interface 26 of the Mobile Terminal 2. In contrast hereto the Higher Layer 38 of the Access Point 4 enables the data transfer via the Ethernet interface 46 of the Access point 4.

The invention in this embodiment is implemented best by modifications in the Data Link Layers 33, 34. In the Data Link Layer of HIPERLAN/2 the format of the Transport channels are specified. The format of a Long Transport Channel LCH (sub-clause 6.1.4 of ETSI TS 761-1) consists of fifty-four octets. A LCH PDU type is provided at the two most significant bits (bits 8 and 7) of the first octet. By setting these two bits to the value "01" this LCH is marked as a "Dummy LCH". The same applies for a Short Transport Channel that consists of only nine octets (sub-clause 6.1.5 of ETSI TS 761-1). Setting the four most significant bits of the first octet to the value "1001" defines this SCH as a "Dummy SCH". Preferably a SCH is used for the purpose of adapting the different error protection levels, as the "Dummy SCH" is shorter than the "LICH" and therefore causes less overhead.

The sequence number of a DLC message is contained the bits 1 to 6 of the first octet and bits 5 to 8 of the second octet of a DLC message. A receiver always evaluates the LCH PDU type or the SCH PDU type field and finding a "Dummy LCH" or a "Dummy SCH" this PDU will be dropped. Nevertheless, as every PDU has to be decoded before the PDU type field could be read, the decoder is already adopted to another error protection level, when a Dummy PDU is dropped.

Figure 9:
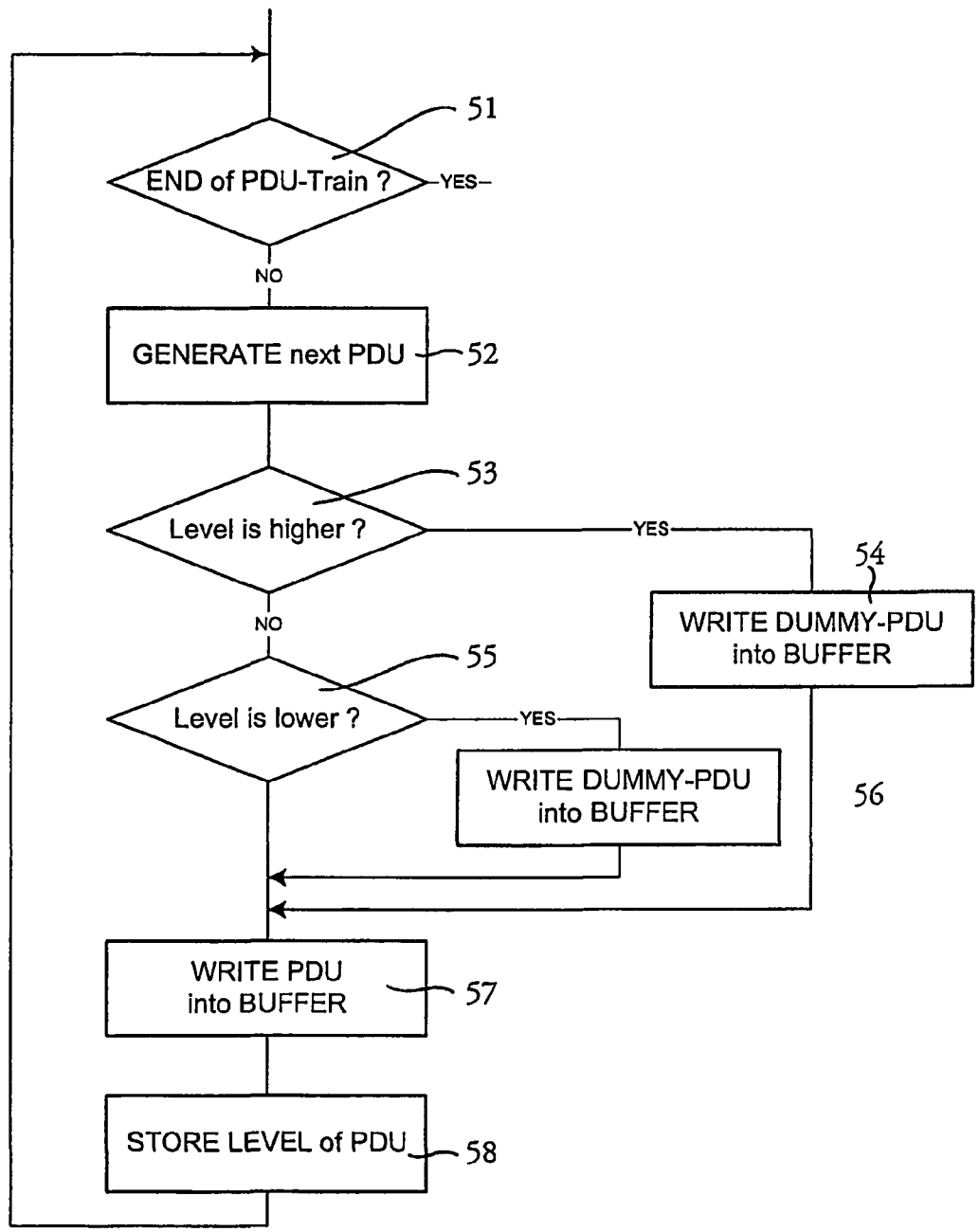

The modifications in the DLC layer are now explained by means of a flow chart shown in FIG. 9. In order to be concise only the part of the DLC layer that arranges the train of PDU is sketched in that flow chart. As long as there is still a PDU to be attached (END OF PDU TRAIN=NO) (decision block 51) at the end of a current PDU train the following loop is carried out. A current PDU is written at the end of that loop into a buffer (block 57) from which it is read out by PHY layer routines. Each time a PDU is written into that buffer the Physical Layer Mode of that PDU is stored (block 58). After a new PDU has been generated (block 52) and is ready to be written into the buffer its Physical Layer Mode is compared (decision block53) with the Physical Layer mode of the preceding PDU which has been stored in the preceding loop process. Is the error protection level of the Physical Layer Mode of the current PDU higher then the error protection level that has been stored in the preceding loop process then a "Dummy PDU" is generated and written into the buffer (block 54). This "Dummy PDU" is foreseen to be transmitted in the same Physical Layer mode as the current PDU. Is in contrast hereto the error protection level of the Physical Layer Mode of the current PDU lower (decision block 55) than the error protection level that has been stored in the preceding loop process then also a "Dummy PDU" is generated and written into the buffer (block 56). But in this case it is foreseen to transmitted this "Dummy PDU" in the same Physical Layer mode as the current PDU. In both cases and in the case no change of the error protection level has been detected the current PDU is written as usual to the buffer (block 57). Additionally to the usual PDU processing the Physical Layer mode of the PDU is stored (block 58). Thus the Physical Layer Mode that has been stored for the preceding PDU in the preceding loop process is overwritten.

Figure 5A:
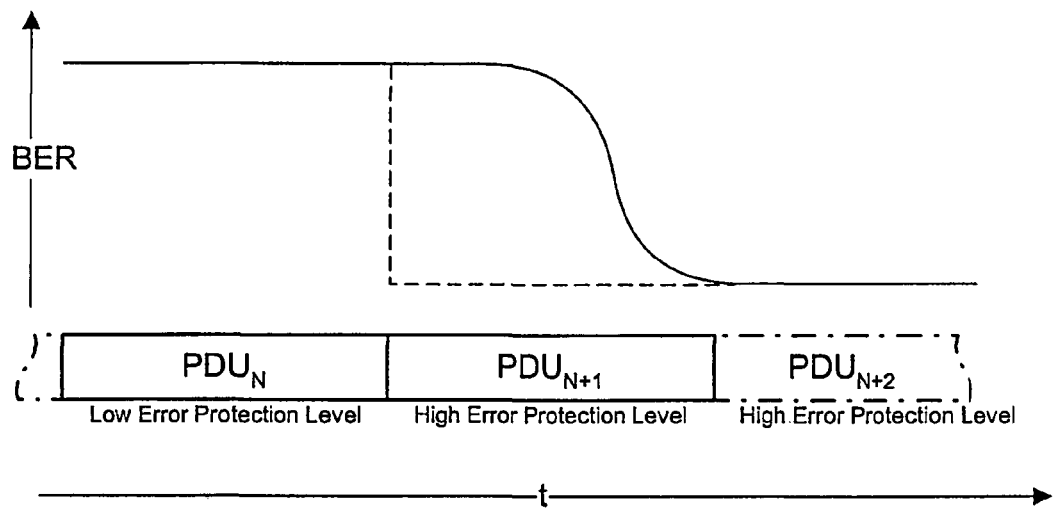
Figure 5B:
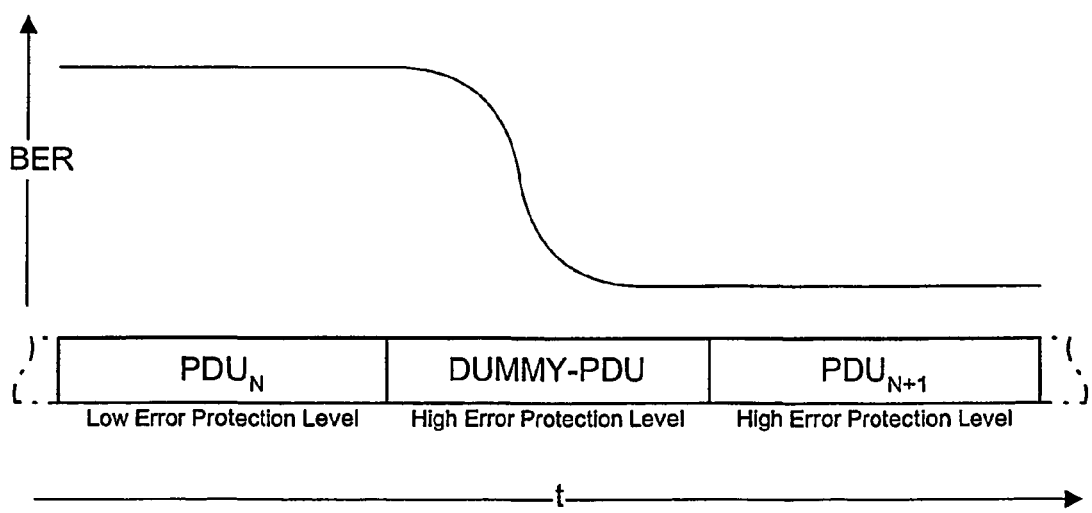
Figure 6A:
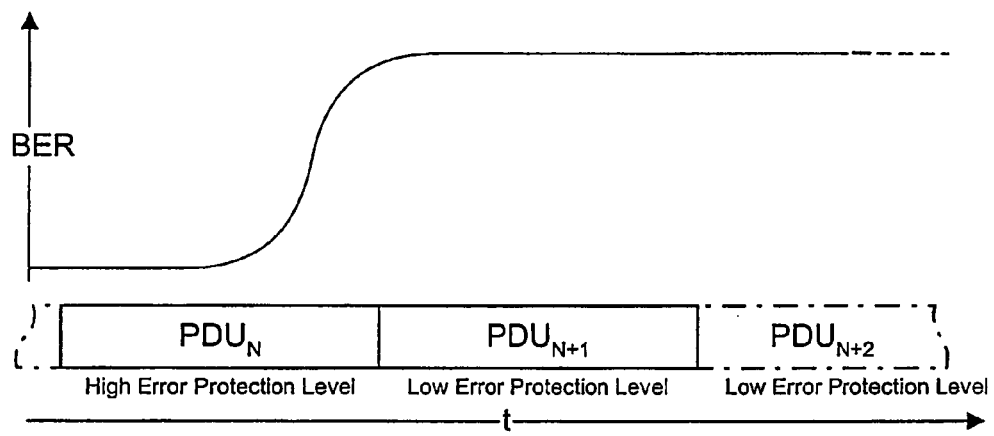
Figure 6B:
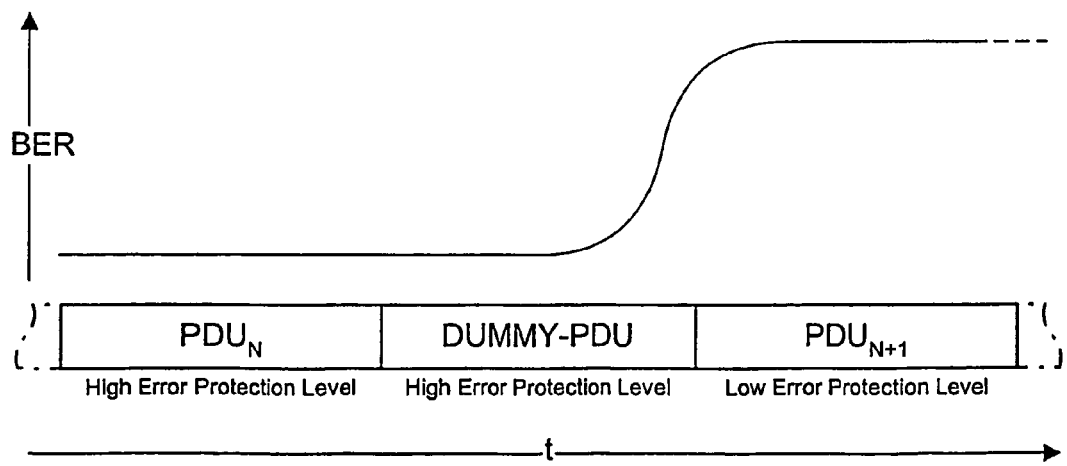

FIG. 5a shows how the error rate changes if a last packet $PDU_N$ of a first sub-train of packets $PDU_1 \ldots PDU_N$ with low error protection level is followed by a first packet $PDU_{N+1}$ of a second sub-train $PDU_{N+1} \ldots PDU_{N+M}$ with a higher error protection level. Instead of switching immediately from a high bit error rate to a lower bit error rate the Bit Error Rate starts to degrade gradually with the beginning of the second packet $PDU_{N+1}$. FIG. 5b shows in contrast hereto the change of the bit error rate if a supplementary packet DUMMY-PDU is inserted between the two PDU packets $PDU_N$, $PDU_N+1$. Then the bit error rate degrades within the supplementary packet DUMMY-PDU and is constant within the following packet $PDU_{N+1}$. To show the principle course of the curve independent from other impacts the transmission channel has been assumed to be constant over time in these cases.

Figure 10:
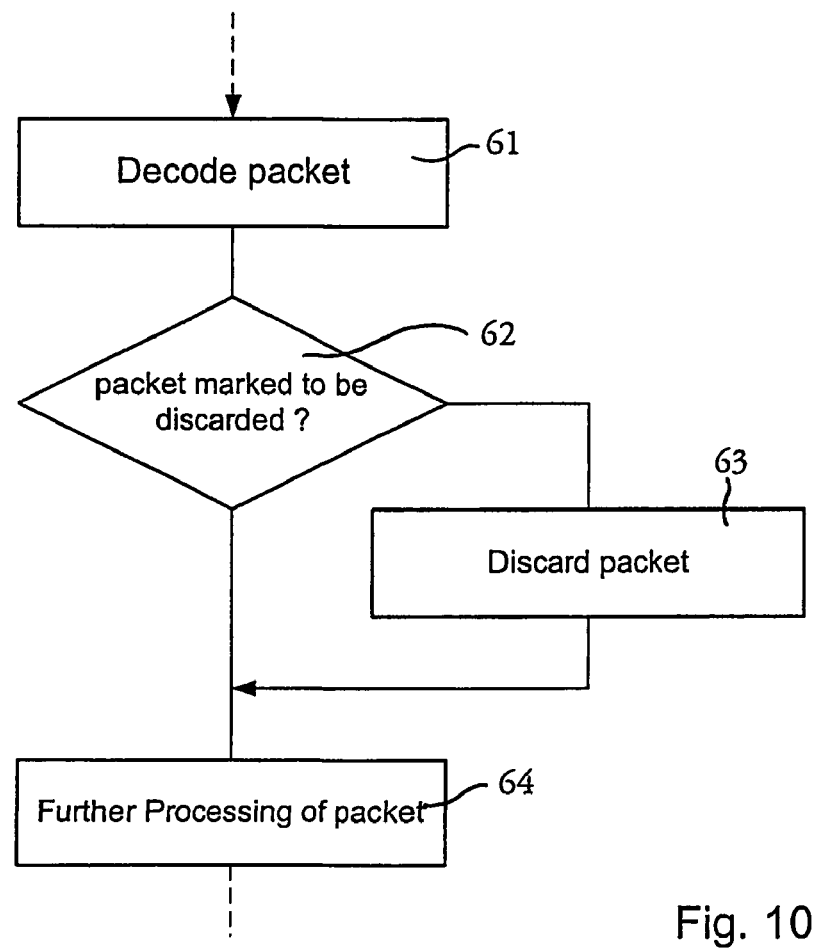

As it has been emphasized in case of a HIPERLAN/2 system if Dummy PDUs are used no change in the receiver is required. In other packet transmission systems that do not provide a possibility to play that trick to the receiver the receiver has to be modified accordingly. FIG. 10 shows that part of a receiver where packets are decoded (block 61) and passed for further processing (block 64). Just one decision has to be inserted between those two blocks. Is the current decoded packet a packet that has been marked to be discarded? (decision block 62). If yes then discard this packet (block 63).

Another embodiment makes use of the Error Control mechanism of HIPERLAN/2. Access Points and Mobile Terminals conforming to HIPERLAN/2 shall support three error control modes: Acknowledged Mode, Repetition Mode and Unacknowledged Mode. For this purpose it is specified that all LCHs could be identified by a sequence number of length ten bits which is interpreted modulo $2^{10}$. The sequence number is incremented by one for subsequent LCHs and calculated modulo $2^{10}$. A maximum window size is negotiated at set up. The maximum possible window size in Acknowledged Mode is limited to half the size of the sequence number space and in Repetition mode a so-called acceptance window is defined in the same size to prevent ambiguities in the interpretation of sequence numbers. In Acknowledged mode the receiver discards all LCHs if their sequence number is outside the receiver's window (specified in sub-clause 6.4.2.10 of ETSI TS 101 761-1) and in Repetition mode all sequence numbers outside the acceptance window are also definitely discarded (sub-clause 6.4.3.8 of ETSI TS 101 761-1). In Repetition mode the transmitter is allowed to make arbitrary repetitions of each LCH (sub-clause 6.4.3.7 of ETSI TS 101 761-1).

In another embodiment this specifications can be used to mark a supplementary packet just by repeating packets. Due to the sequence number the receiver will be able to observe the repetition. Depending on the receiver's strategy how identical packets are processed the same effect as inserting a packet may be achieved. E.g. if a strategy is already implemented in a receiver that always the less distorted packet of two identical packets (received within a given window) will be transferred to the Convergence Layer, nothing has to changed or added in a receiver, as will be shown in the following.

Figure 7A:
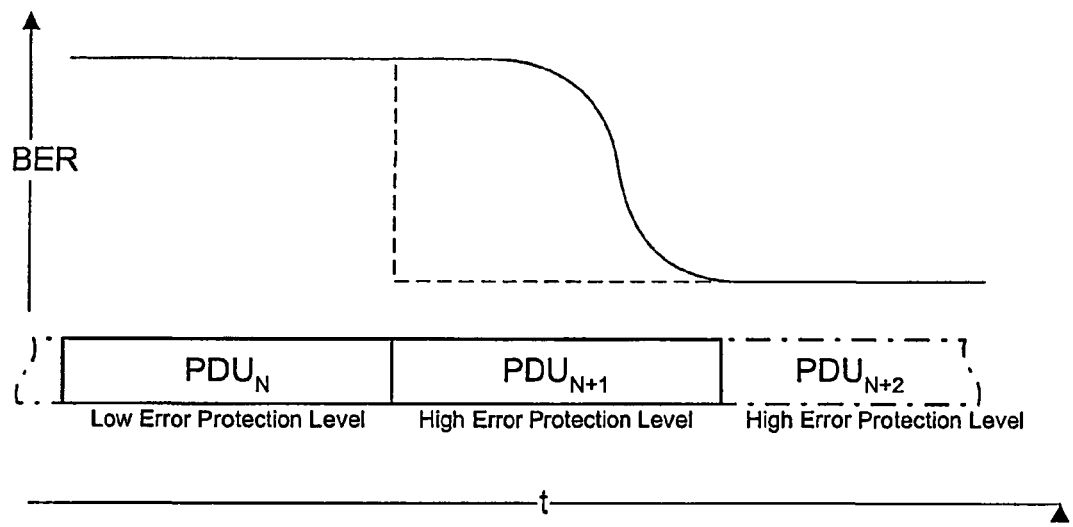
Figure 7B:
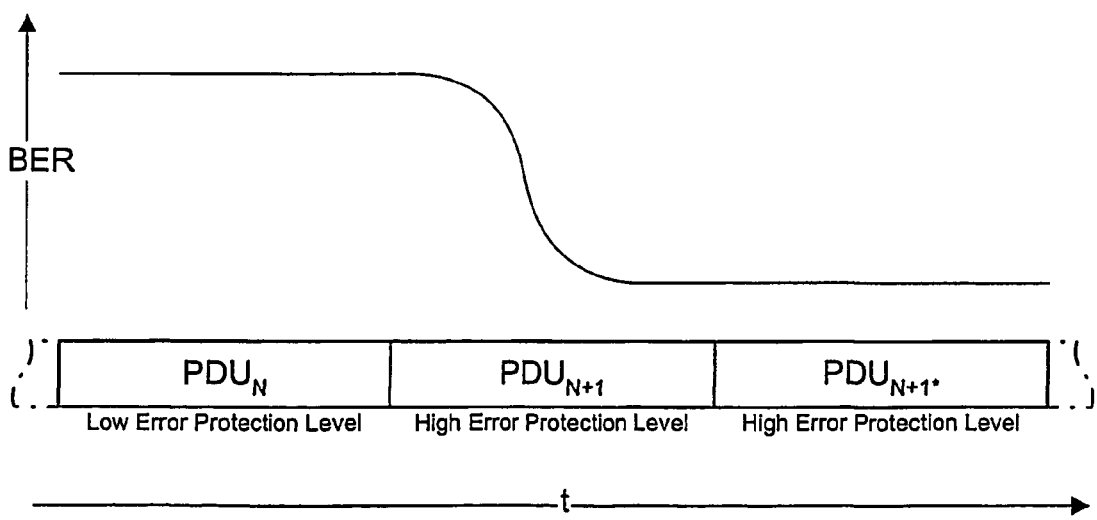

In case the error protection level is changed from a lower level to a higher level at the transition from a first sequence of packets $PDU_1 \ldots PDU_N$ to a second sequence of packets $PDU_{N+1} \ldots PDU_{N+M}$ the first packet $PDU_{N+1}$ of the second sequence of packets $PDU_{N+1} \ldots PDU_{N+M}$ is transmitted a second time as $PDU_{N+1}*$ as depicted in FIG. 7b. In principle the first packet $PDU_{N+1}$ of the two identical packets $PDU_{N+1}$, $PDU_{N+1}*$ will suffer from the error protection level transition and therefore will be more corrupted than the repeated packet $PDU_{N+1}*$. Therefore in this case the repeated packet $PDU_{N+1}*$ will always be the better one and will be passed to further processing. In case the error rate degradation is not such severe or the channel properties are changing very fast in some case also the first packet $PDU_{N+1}$ may be the better one and should be passed further one. In case the error protection level is changed from a higher level to a lower level at the transition from a first sequence of packets $PDU_1 \ldots PDU_N$ to a second sequence of packets $PDU_{N+1} \ldots PDU_{N+M}$ the last packet $PDU_N$ of the first sequence of packets $PDU_1 \ldots PDU_N$ is transmitted a second time as $PDU_N*$ as depicted in FIG. 5b. In this case usually the first occurrence of $PDU_N$ will be less distorted than the second occurrence of $PDU_N*$. Therefore the optimum strategy in view of reliability is to process the less distorted packets if identical packets have been received.

However there are other possible design rules for the receiver that will achieve mostly the same effect. For example if identical packets are received after the error protection level has been changed from low to high always the latest packet (=the repeated packet) of identical packets is passed further one. As it has been pointed out this packet usually is the better one. In the other case if identical packets are received after the error protection level has been changed in the other way (from high to low) always the first packet is processed and any following identical packets (=repeated packets) are discarded.

Another possibility is to mark a supplementary packet by assigning the supplementary packet a sequence number outside the receiver's window. E.g. the sequence number of the preceding packet or the succeeding packet is taken for the supplementary packet and a number greater than the window size is added modulo $2^{10}$. For instance $2^9$ is added modulo $2^{10}$. By this in any case the sequence number will be outside the maximum window size of $2^8$.

The next embodiment uses the Future Use bits for the purpose of code termination. To provide the possibility using this FUB in the future for other purposes some of them are used as a flag to indicate how much of the FUB are used for code termination. This solution introduces for an existing system like HIPERLAN/2 in principal no additional overhead nor does it create a performance degradation that decreases the gain provided by the code termination. The only overhead is caused by the flag bits, which are taken from the FUB and are therefore not available any more for other purposes.

For example, if there are 8 FUB specified a solution could be to take 2 FUB as a flag to indicate how much of the remaining 6 FUB are used for code termination. The number of the FUB indicated by the flag bits are used for code termination, which means that they must be equal to zero.

TABLE 2

Content of the 8 FUB

| First 2 FUB (flag bits) | Content of the remaining 6 FUB (x indicates future use, 0 indicates code termination) |
| --- | --- |
| 00 | 000000 |
| 01 | 0000xx |
| 10 | 00xxxx |
| 11 | xxxxxx |

In HIPERLAN/2 there are 4 different information types which are transmitted in a SCH carrying more than 1 FUB. In Table 3 the information types and the number of FUB are listed. To be able to use the nine FUB of the ARQ feedback message as code termination bits the FUB must be transmitted at the end of the information field. This must be specified in the standard. Due to the fact that the method using the FUB for code termination has to be standardized the additional change of the ARQ feedback message field does not take into account. Depending on the number of FUB the number of the flag bits should vary. E.g. if only four FUB are available one should only use one FUB as flag bit indicating if code termination is performed or not. In this case the flag bit is an on/off switch.

TABLE 3

PDU information type with number of FUB

| Information type | Number of FUB |
| --- | --- |
| Resource Request for uplink | 5 |
| Resource Request for direct link | 4 |
| Discard message for downlink and direct link | 32 |
| ARQ feedback for downlink and direct link | 9 |

Because the FUB are normally scrambled at the transmitter two solutions are possible: The FUB are not scrambled in the transmitter or the FUB are scrambled like all other bits but they are descrambled before the decoding process in order to check whether they are used for code termination or not.

Figure 11:
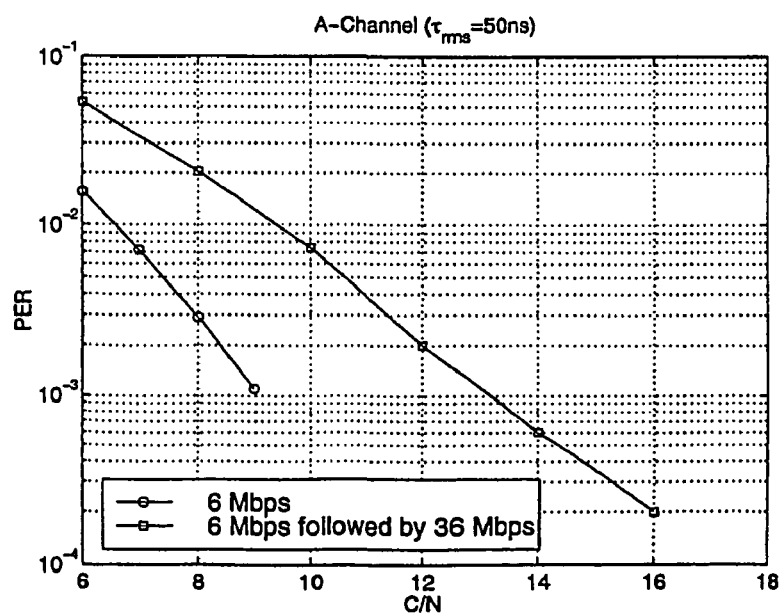

FIG. 11 shows the packet error rates (PER) over the carrier-to-noise (C/N) ratio for SCHs transmitted with the 6 Mbps mode. The curve labeled with the circles shows the PER when the SCHs are not followed by LCHs transmitted with the 36 Mbps which is equal to the case when enough FUB bits are available for code termination.

The curve labeled with squares shows the PER when the SCHs are followed by LCHs transmitted with the 36 Mbps mode. It can be seen that the provided gain is up to 4 dB when there are enough FUB. But even in the case when only very few FUB are available a considerably large gain can be obtained. In principle this result is also valid for the embodiments with the supplementary packets although due to the overhead introduced by the inserted packets the gain is not as good as if the Future Use bits are used for code termination.

Furthermore it has to be mentioned that the invention is not restricted to the specific embodiments and examples described in the present invention. That is, on the basis of the teaching contained in the description, various modifications and variations of the invention may be carried out by a person skilled in the art. E.g. if a repetition of a packet is used to mark a supplementary packet it may be also considered not to discard the redundant information which is contained in the supplementary packet but to use this redundancy to improve the error correction of the packet that has been copied.

Terminology and Abbreviations

| | |
|---|---|
| ACH | Access Feedback Channel |
| BCH | Broadcast Channel |
| BER | Bit Error Rate |
| BPSK | Binary Phase Shift Keying |
| DLC | Data Link Control |
| FCH | Frame Channel |
| FU | Future Use |
| FUB | Future Use Bits |
| HIPERLAN | High Performance Radio Local Area Network |
| LCH | Long Transport Channel |
| MAC | Medium Access Control |
| OFDM | Orthogonal Frequency Division Multiplexing |
| PDU | Protocol Data Unit |
| PER | Packet Error Rate |
| QAM | Quadrature Amplitude Modulation |
| QPSK | Quaternary Phase Shift Keying |
| RCH | Random Channel |
| SCH | Short Transport Channel |
| TDD | Time Division Duplex |
| TDMA | Time Division Multiple Access |
| WLAN | Wireless Local Area Network |

The invention claimed is:

1. Packet transmission system within a wireless transmission system, where data is transmitted in packets at different error protection levels and where the error protection level of one packet may differ from the error protection level of a preceding packet without providing code termination between the said preceding and the said succeeding packet comprising:
in case a different error protection level is used by the preceding packet and the succeeding packet, means for inserting a supplementary packet between the preceding and the succeeding packet whereby the error protection level of the supplementary packet is higher than the lowest error protection level that is used either by the preceding or the succeeding packet and the supplementary packet is transmitted with the preceding packet and the succeeding packet.

2. Packet transmission system according to claim 1 whereby the error protection level of the supplementary packet is equal to the error protection level of the highest error protection level either of the preceding or the succeeding packet.

3. Packet transmission system according to claim 1 whereby the error protection level is defined by the code rate of the packets.

4. Packet transmission system according to claim 1 hereby as error protection level is defined by the modulation scheme used for a packet.

5. Packet transmission system according to claim 1 whereby the error protection level is defined by a combination of the code rate and the modulation scheme used for a packet.

6. Packet transmission systems according to claim 1 wherein the supplementary packet is a dummy packet.

7. Packet transmission system according to claim 1 wherein the supplementary packet is a repetition of one of the preceding packet or the succeeding packet.

8. Device for a packet transmission system within wireless transmission system, including a transmitter, where data is transmitted by said transmitter in packets at different error protection levels and where the error protection level of one succeeding packet may differ from the error protection level of a preceding packet without providing code termination between the said preceding and the said succeeding packet wherein,
the transmitter inserting a supplementary packet between the preceding packet and the succeeding packet whereby the error protection level of the supplementary packet is higher than the lowest error protection level that is used either by the preceding or the succeeding packet and the supplementary packet is transmitted with the preceding packet and the succeeding packet.

9. Device for a packet transmission system according to claim 8 whereby the transmitter marks the inserted packet as a supplementary packet.

10. Device for a packet transmission system, within a wireless transmission system according to claim 8 further, comprising a receiver that is designed to demodulate and decode packets that have been received at different error protection levels comprising:
means for discarding packets which have been marked as dummy packet and inserted between packets of different error protection levels.

11. A method for transmitting packets within a wireless transmission system wherein different error protection levels are used within a wireless transmitter and a wireless receiver, wherein the error protection level associated with a first packet may differ from the error protection level associated with a second packet without providing code termination therebetween, comprising the steps:
detecting whether said error protection level associated with said second packet is different from said error protection level associated with said first packet; and
in response to said detection, inserting a supplementary packet between said first packet and said second packet, wherein said supplementary packet is assigned an error protection level higher than the lowest error protection level that is being used by said first packet and said second packet and the supplementary packet is transmitted with the preceding packet and the succeeding packet.

12. The method of claim 11 wherein said error protection level assigned to the supplementary packet is equal to the error protection level of the highest error protection level associated with said first or second packets.

13. The method of claim 11 wherein said error protection level is defined by the code rate of the packets.

14. The method of claim 11 wherein said error protection level is defined by the modulation scheme used for a packet.

15. The method of claim 11 wherein said error protection level is defined by a combination of a code rate and modulation scheme used for a packet.

16. The method of claim 11 wherein said supplementary packet is a dummy packet to be discarded by said wireless receiver.

17. The method of claim 11 wherein said supplementary packet is a repetition of one of said first or second packet.

* * * * *

UNITED STATES PATENT AND TRADEMARK OFFICE
CERTIFICATE OF CORRECTION

PATENT NO. : 7,333,449 B2
APPLICATION NO. : 10/432519
DATED : February 19, 2008
INVENTOR(S) : Zimmermann et al.

Page 1 of 1

It is certified that error appears in the above-identified patent and that said Letters Patent is hereby corrected as shown below:

In Column 9, Line 34, delete ""LICH"" and insert -- "LCH" --, therefor.

In Column 10, Line 21, delete "$PDU_{N+}1$." and insert -- $PDU_{N+1}$. --, therefor.

Figure 8A:
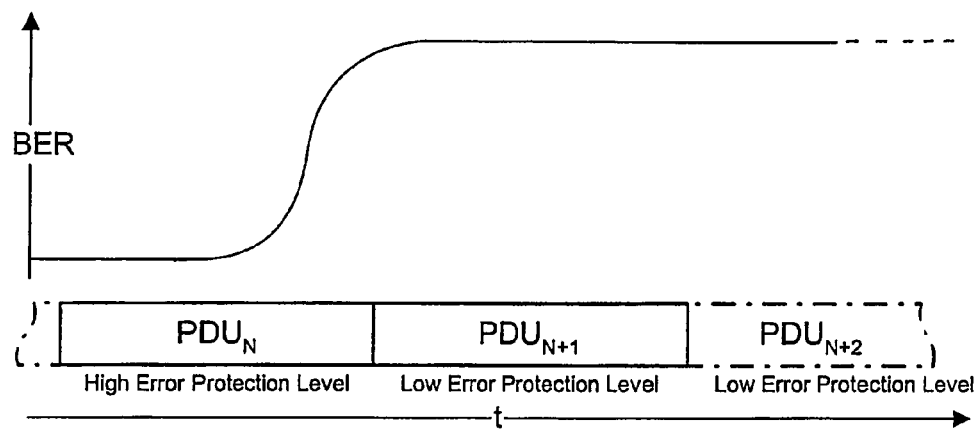
Figure 8B:
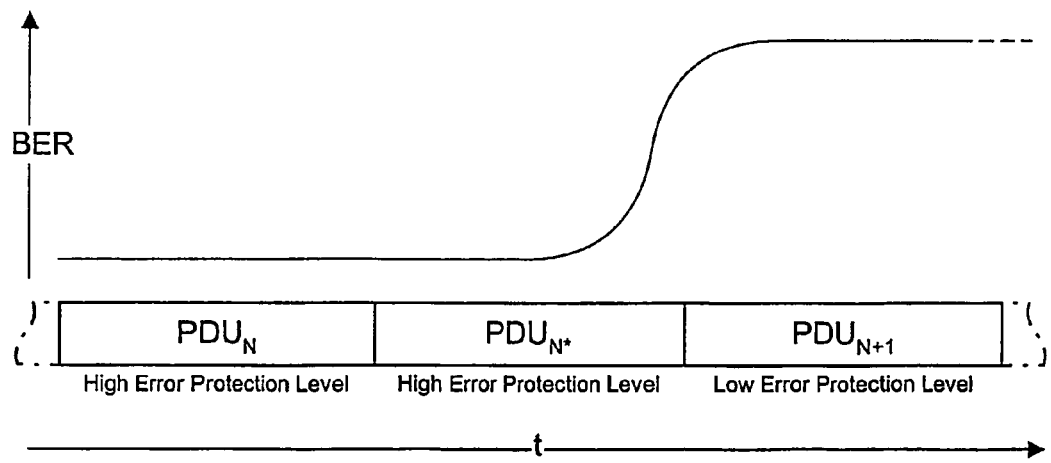

In Column 11, Line 25, delete "FIG. 5b." and insert -- FIG. 8b. --, therefor.

Signed and Sealed this

Fourteenth Day of October, 2008

JON W. DUDAS
*Director of the United States Patent and Trademark Office*